S. E. ROBINSON.
PRUNING IMPLEMENT.
APPLICATION FILED OCT. 21, 1914.
1,188,836.
Patented June 27, 1916.
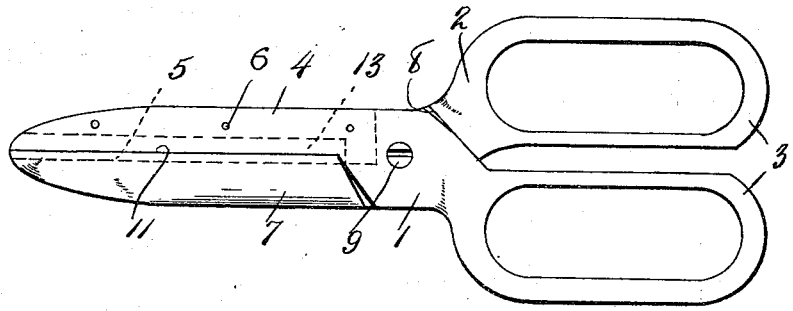
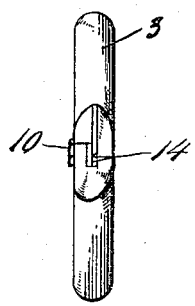
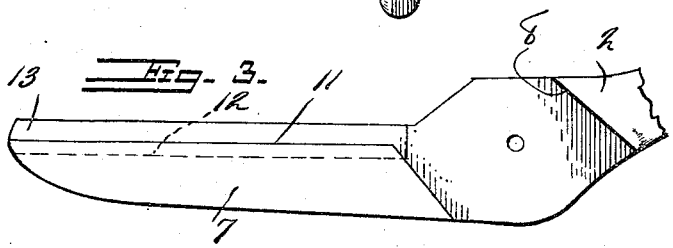
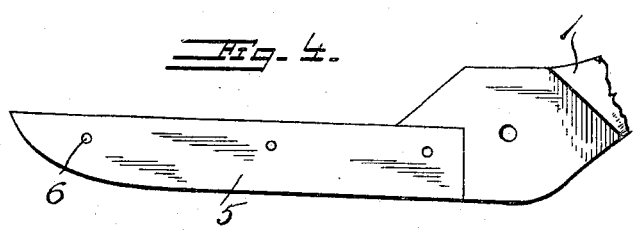
Witnesses
Edw. S. Hall.
Wm. H. Downing
Inventor
Sheldon E. Robinson.
By Richard B. Owen.
Attorney

UNITED STATES PATENT OFFICE.

SHELDON E. ROBINSON, OF SPRINGWATER, NEW YORK.

PRUNING IMPLEMENT.

1,188,836.  Specification of Letters Patent.  Patented June 27, 1916.

Application filed October 21, 1914. Serial No. 867,820.

*To all whom it may concern:*

Be it known that I, SHELDON E. ROBINSON, a citizen of the United States, residing at Springwater, in the county of Livingston and State of New York, have invented certain new and useful Improvements in Pruning Implements, of which the following is a specification.

My invention relates to pruning implements.

The primary object of my invention resides in the provision of a pruning implement for picking fruit, grapes, flowers and the like, the cutting means thereon having novel means associated therewith for holding the fruit or flowers that have been cut and preventing the same from falling to the ground and becoming injured.

Another object of my invention resides in the provision of a novel means for mounting the cutting means on the blade portions of the implement, a part of the cutting means being removably associated with the blade portions so as to facilitate the sharpening of the blade.

A further object of my invention resides in the provision of identical handles for the implement, thus providing an efficient means for the implement so that it can be used with either hand, it being preferable that the flowers be cut with the stem up while fruit with the stem down.

A still further object of my invention resides in the provision of a device of the character described that is simple in construction, efficient in operation and one that can be manufactured and placed on the market at a minimum cost.

Other objects as well as the nature, characteristic features and scope of my invention will be more readily understood from the following description taken in connection with the accompanying drawings and pointed out in the claims forming a part of this specification.

In the drawings: Figure 1 is a top plan view of my invention; Fig. 2 is a front elevational view of the same; Fig. 3 is an enlarged fragmentary side elevational view of one of the blade portions; and Fig. 4 is a similar view of the other of the blade portions in front elevation. Fig. 5 is a transverse sectional view taken through Fig. 1 adjacent the point thereof, illustrating to advantage the arrangement of the blades and the wedge.

Referring more particularly to the drawings in which similar reference numerals designate like or corresponding parts throughout the different views, I provide a pair of pivotally connected shears 1 and 2 having identical handles 3 so that the implement can be used with either hand, the front or cutting faces of the blade portions of the shears being complementary cut so as to be operated upon the actuation of the handles. One of the shears 1 has the blade portion 4 thereof offset from the longitudinal axis thereof, the inner face of the blade portion being cut away and has a blade 5 embedded therein from a point adjacent the pivot point, the blade having the outer end thereof curved to conform to the contour of the blade portion of the shears and which blade is secured to the blade portion by means of a plurality of uniformly spaced rivets 6 or like fastening devices. The inner edge of the blade is beveled slightly inwardly toward the blade portion to facilitate the operation of the parts. The other of the shears has the blade portion 7 offset from the longitudinal axis of the handle 3 and further has the inner face thereof at the point of distortion of the blade portion provided with a diagonally arranged recess 8. The shear is further provided at substantially the center of the recess 8 with an opening through which is passed a screw or like fastening device 9, the screw also passing through the other of the shears at a point adjacent the shoulder provided when the same is reduced, which screw has the free end thereof adjustably engaged by a nut 10 for holding the shears in operative relation with each other. The shear 2 has the inner edge thereof reduced to provide a shoulder 11, the latter being arranged in parallel relation with the inner edge thereof and constitutes a ledge adapted for abutting relation with the inner face of the blade portion 4 of the shear 1, for a purpose to be hereinafter described. The blade portion 7 of the shear 2 is further provided at the point of juncture of the shoulder 11 with an inwardly extending longitudinally arranged recess 12, the recess 12 communicating with the recess 8. A blade 13 is embedded in the blade portion adjacent the recess and is held therein by means of an elongated wedge 14 which is driven within the recess 12 and normally arranged substantially flush with the shoulder 11. By this arrangement when it is desired to remove the blade 13 all that is necessary is to remove the wedge. Incidentally the wedge is beveled to receive the beveled edge of the blade 5 when the shears are closed.

The operation of my invention is as follows: When it is desired to cut an apple or the like from a tree it is preferable that the handles 3 of the shears be engaged so that the shoulder 10 will come in contact with the upper surface of the apple, the blade portions of the shears being engaged about the stem so that when the handles are drawn toward each other the blades 5 and 13 will sever the stem. During this operation that portion of the stem immediately continuing from the apple will be engaged by the shoulder 11 which bears against the inner face of the blade portion 4 and held therein, whereupon the same can be dropped into a suitable receptacle, not shown, at hand. In cutting flowers it is preferable that the handles 3 be arranged so that the shoulder 11 will be face up, the stem of the flower being severed and held so that the cut flower will extend above the implement.

This implement is of great advantage when picking and cutting roses from a plant that is thorny, it being only necessary to use one hand which can be held away from a thorny stem whereas the old method of cutting a flower necessitates the use of both hands, one of which in the majority of cases comes in direct contact with the thorny stem and in this manner is often severely scratched.

Although I have shown and described the preferred embodiment of my invention, I desire to be understood that I am not to be limited to the exact details shown, however, great stress is laid upon the arrangement and formation of the shoulder 11 on one of the blade portions which coöperates with the inner face of the other of the blade portions to provide a suitable holding means or clamp for the stem of the fruit or flower for holding the same after the fruit or flower has been cut without necessitating the use of the other hand of the user or other receiving means.

From the above description taken in connection with the accompanying drawings, it can easily be seen that I have provided a device that is simple in construction containing but a few simple parts that can be cheaply manufactured and assembled and when assembled can be placed upon the market and sold at a minimum cost.

It will be understood that the above description and accompanying drawings comprehend only the general and preferred embodiment of my invention and that various minor changes in detail of construction, proportion and arrangement of the parts may be made within the scope of the appended claims and without sacrificing any of the advantages of my invention.

Having thus fully described my invention, what I claim as new and desire to secure by Letters Patent, is:—

1. A pruning implement including pivotally connected shears, handles formed on the inner ends thereof, blade portions offset from the longitudinal axes of said handles, coöperating blades embedded in the adjacent inner faces of the blade portions and arranged so that the outer surfaces thereof contact with each other when the scissors are closed, a shoulder extending from the inner faces of one of the blade portions and coöperating with the inner edge of the other of the blade portions for holding the stem of a flower or fruit after the same has been severed, and a wedge insertible on one of the blade portions adjacent the shoulder for removably holding one of the blades in position.

2. A pruning implement including a pair of pivotally connected shears, handles on said shears, blade portions offset from the longitudinal axes of said handles, blades embedded on the inner faces of said blade portions for coöperation with each other upon the actuation of the handles, one of said blade portions provided with a longitudinal groove adjacent the point of securement of the blade thereon, a wedge removably mounted in said groove for removably maintaining the blade in position on the blade portion, and means provided on one of the blade portions for coöperating with the other of the blade portions for holding the stem of a flower or fruit after the same has been severed by the blades.

3. A pruning implement including a pair of pivotally connected shears, handles formed on said shears, blade portions offset from the longitudinal axes of said handles, a blade embedded on the inner face of one of said blade portions, a shoulder provided on the other of the blade portions, said blade portion being provided with a longitudinal groove between the blade portion and the shoulder, a blade resting on the blade portion and positioned within the groove, an elongated wedge associated with the groove and the blade for removably maintaining the blade in position, said wedge being beveled to accommodate the beveled edge of the blade on the other blade portion, and the inner edge of one blade portion coöperating with the inner edge of the shoulder for holding the stem of a flower or fruit after the same has been severed by the blades upon the actuation of the handles.

In testimony whereof I affix my signature in presence of two witnesses.

SHELDON E. ROBINSON.

Witnesses:
CLARE B. ALLEN,
W. W. BOIES.

Copies of this patent may be obtained for five cents each, by addressing the "Commissioner of Patents, Washington, D. C."